(12) United States Patent
Hawthorne et al.

(10) Patent No.: US 6,344,523 B1
(45) Date of Patent: Feb. 5, 2002

(54) REDUCED TEMPERATURE CURING OF ACETYLENIC POLYMERS

(75) Inventors: David Geoffrey Hawthorne, Oakleigh; Jonathan Howard Hodgkin, Burwood, both of (AU)

(73) Assignees: Commonwealth Scientific and Industrial Research Organization of Campbell (AU); The Boeing Company, Seattle, WA (US)

(*) Notice: Subject to any disclaimer, the term of this patent is extended or adjusted under 35 U.S.C. 154(b) by 0 days.

(21) Appl. No.: 09/380,505

(22) PCT Filed: Mar. 6, 1998

(86) PCT No.: PCT/AU98/00147

§ 371 Date: Dec. 10, 1999

§ 102(e) Date: Dec. 10, 1999

(87) PCT Pub. No.: WO98/40422

PCT Pub. Date: Sep. 17, 1998

(30) Foreign Application Priority Data

Mar. 7, 1997 (AU) .............................. PO 5493

(51) Int. Cl.$^7$ ................................ C08F 38/02
(52) U.S. Cl. ................ 525/328.1; 525/436; 526/222; 526/223; 526/285; 428/297.4
(58) Field of Search .............. 525/436, 328.1; 526/222, 223, 285; 428/297.4

(56) References Cited

U.S. PATENT DOCUMENTS 5,606,014 A * 2/1997 Connell et al. ............ 528/353

OTHER PUBLICATIONS

Derwent Abstract Accession No. 88–342955/48, Class A26, JP, A, 63–256604 (Higashimura) Oct. 24, 1988 (Abstract).

Derwent Abstract Accession No. 90–234353/31, Class A41, JP, A, 02–160752 (Agency of Ind. Sci. Tech.) Jun. 20, 1990 (Abstract).

Derwent Abstract Accession No. 76–83551X/45, Class A26, DE, A, 2616 691 (Hughes Aircraft) Oct. 28, 1976 (Abstract).

* cited by examiner

Primary Examiner—James J. Seidleck
Assistant Examiner—Melanie D. Bagwell
(74) Attorney, Agent, or Firm—Sughrue Mion, PLLC

(57) ABSTRACT

The invention provides a method for promoting the curing reactions of an acetylenic oligomer or polymer, characterized in that the oligomer or polymer is cured in the presence of sulfur or an organic sulfur derivative which is capable of lowering the temperature of cure of the oligomer or polymer. The invention also provides a process for producing a polyimide oligomer or polymer containing an aliphatic or aromatic disulfide moiety which is covalently bound to, and forms an integral part of the oligomer or polymer and which is capable of lowering the temperature of cure of the oligomer or polymer, characterised in that a suitable amount of a diamino-disulfide or dianhydride-disulfide, or any suitable derivative or precursor thereof, is introduced into the mixture of aromatic diamines, tetracarboxylic dianhydrides, and the phenylethynyl-substituted amine or anhydride normally used for the reparation of the oligo-imide.

31 Claims, 3 Drawing Sheets where:

where:

REDUCED TEMPERATURE CURING OF ACETYLENIC POLYMERS

This invention relates to a method for lowering the curing temperature of acetylenic substituted polymers. The method of the invention is particularly, but not exclusively, concerned with the curing of acetylenic polyimides.

Aromatic polyimides are widely used as resins for moulding of plastics articles, as adhesives, and as matrices for composite materials intended for service at elevated temperatures. Such polyimides are generally produced by the condensation of a mixture of one or more diarnines with a stoichiometric amount of one or more tetracarboxylic dianhydrides in a suitable solvent such as dimethyl formamide or N-methylpyrrolidone to form a polyamic acid which on heating can undergo cyclodehydration to form the polyimide (for example, as shown in FIG. 1 of the accompanying drawings). Often the intermediate polyamic acid solution is used for coating the articles which are then heated to form the polyimide in-situ.

Whilst polyimides of high molecular weight are required for the development of adequate mechanical strength, it is often preferred, for ease of production and other reasons, to employ a lower molecular weight, oligomeric imide or amic acid containing substituents which can undergo chain extension and crosslinking reactions during thermal processing to form the cured thermoset resin. Examples of such systems already widely used in industry include the bismaleimides and the nadimide-based PMR resins which undergo cure at temperatures near 250° C. Many other systems have been described in the literature, but these have apparently failed to obtain commercial acceptance.

One disadvantage of most of these thermoset polyimides is their failure to withstand oxidative degradation on long-term exposure at temperatures above 200° C. This is because the crosslinking moieties have generally inferior thermal stability, compared to the oligoimide units, and therefore can act as weak links in the polymeric structure.

One class of thermoset polyimides which does appear to provide adequate thermal stability are those containing phenylethynyl-substituted aromatic species as the reactive moieties, e.g.:

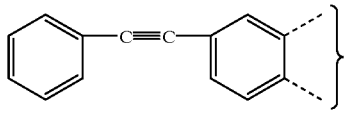

Such systems have been described in patents assigned to National Starch (e.g., U.S. Pat. No. 5,138,028) and the United States National Aeronautics and Space Administration (e.g., U.S. Pat. No. 5,567,800). However, the processing of these phenylethynyl resins requires curing at much higher temperatures (350–400° C.) than those typically required for the cure of the bismaleimide or nadimide resins.

The chemistry involved in the curing of the phenylethynyl (phenylacetylenic) resins has not been conclusively established, but is believed to involve the initial condensation of two or more ethynyl (acetylenic) groups to form a mixture of linear poly-enes or ene-ynes which can then undergo a variety of inter- and intra-molecular addition and substitution reactions to form the crosslinked, fully cured product. The initiation of these reactions probably involves adventitious free radical intermediates, although the ethynes (acetylenes) as a class are not particularly susceptible to radical-induced polymerization.

It is therefore conceivable that processing temperature for the phenylethynyl resins could be lowered, for example, by the addition of free radical catalysts such as peroxide initiators, or by utilising the known activation of alkynes by transition metal complexes. However, these approaches have some potential difficulties.

To obtain void-free products, it is desirable that the resin should be fully cyclized before onset of the cure reactions, and should be free of solvents, amic acid residues, and other species which could evolve volatile by-products during processing. However, the fully cyclized, solvent-free oligo-imides which could serve as precursors for cured resins having the preferred glass transition (Tg) temperatures in excess of 250° C. themselves usually have softening or Tg temperatures above 200° C. and the chain extension and crosslinking reactions cannot proceed at practical rates below the softening point or Tg of the resin. Most peroxidic initiators undergo rapid and irreversible decomposition well below these temperatures, and so would be inefficient as cure accelerators for practical phenylethynyl resins. The use of transition metal catalysts, on the other hand, would leave undesirable residues which could also promote thermooxidative degradation of the cured resin during service at elevated temperatures.

We have now discovered that the addition of suitable organic disulfides or polysulfides, or elemental sulfur, to phenylethynyl-substituted oligo-imides reduces the onset of cure temperature by 50° C. or more, thus enabling the thermal curing of the resins to occur at temperatures at 300° C. or below. We have also found that additional improvements can follow from the structural inclusion of disulfide moieties in oligo-imide chains. These additives or disulfide moieties undergo reversible dissociation at 200° C. or above, preferably 200° C. to 300° C., to form thiyl radicals which can react with the phenylethynyl groups to initiate the cure of the resin.

The use of sulfur, disulfides, and polysulfides as additives in the vulcanization of olefinic elastomers is well known. However, there appears to be no previous reports or claims for their use as curing agents in acetylenic polyimides, or more specifically, the commercially promising phenylethynyl polyimides.

According to the present invention there is provided a method for promoting the curing reactions of an acetylenic oligomer or polymer, which comprises curing the oligomer or polymer in the presence of sulfur or an organic sulfur derivative which is capable of thermally generating thiyl radicals during the curing reaction thereby lowering the temperature of cure of the oligomer or polymer.

The organic sulfur derivative can be selected from disulfides and polysulfides of the formula

wherein ($n \geq 2$) and the substituents R and R' may be substituted or unsubstituted alkyl, cycloalkyl, aryl, arylalkyl, or heterocyclic moieties, and may be the same or different; or derivatives thereof, such as mono- or di-acyl or aroyl disulfides of the formula:

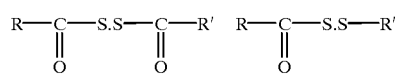

imidyl (imidoyl) or thiocarbamyl disulfides of the formula:

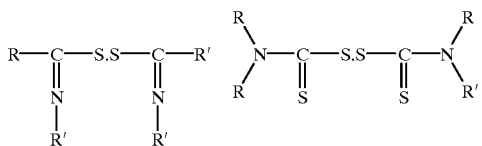

wherein R and R' are as defined above; or other sulfur-containing species, including sulfenyl derivatives and elemental sulfur, which can generate thiyl radicals when heated to the processing temperature of the resins, typically in the range of 150–300° C.

In another aspect the invention provides an acetylenic oligomer or polymer having at least one ethynyl group, characterised in that it comprises an organic sulfur moiety which is covalently bound to, and forms an integral part of the oligomer or polymer and which is capable of thermally generating thiyl radicals during cure of the oligomer or polymer thereby promoting the cure of the oligomer or polymer.

In a further aspect the invention provides a composition which comprises an acetylenic oligomer or polymer having at least one ethynyl group and sulfur or an organic sulfur derivative having an organic sulfur moiety, characterised in that the sulfur or organic sulfur derivative is capable of thermally generating thiyl radicals during cure of the oligomer or polymer thereby lowering the temperature of cure of the oligomer or polymer.

In yet another aspect there is provided a process for producing an acetylenic polyimide oligomer or polymer containing one or more ethynyl group per molecule and containing an aliphatic or aromatic disulfide moiety which is covalently bound to, and forms an integral part of the oligomer or polymer and which is capable of lowering the temperature of cure of the oligomer or polymer, characterised in that a suitable amount of a bis(amino-substituted) hydrocarbyl disulfide or bis(anhydride-substituted) hydrocarbyl disulfide, or any suitable derivative or precursor thereof, is introduced into the mixture of aromatic diamines, tetracarboxylic dianhydrides, and the phenylethynyl-substituted amine or anhydride normally used for the preparation of the oligomer or polymer.

In this specification "substituted" group means that a group is substituted with one or more non-deleterious groups selected from: alkyl, alkenyl, aryl, halo, haloalkyl, haloalkenyl, haloaryl, hydroxy, alkoxy, alkenyloxy, aryloxy, haloalkoxy, haloalkenyloxy, haloaryloxy, amino, alkylamino, alkenylamino, alkynylamino, arylamino, acyl, aroyl, alkenylacyl, arylacyl, acylamino, heterocyclyl, heterocyclyoxy, heterocyclylamino, haloheterocyclyl, alkoxycarbonyl, alkylthio, alkylsulphonyl, arylthio, arylsulphonyl, aminosulphonyl, dialkylamino, dialkylsulphonyl.

In the above, the "aryl" moiety may be phenyl or another mono- or poly-carbocyclic aromatic ring system optionally substituted with one or more alkyl, amino, haloalkyl, halo, or cyano groups.

In the above, the "heterocyclyl" moiety is a 5–8 membered ring containing one to three hetero atoms such as oxygen, nitrogen or sulphur and may be substituted and/or carry fused rings and which may or may not be aromatic or pseudo-aromatic. Examples of such groups includes pyrrolidinyl, morpholinyl, thiomorpholinyl, or fully of partially hydrogenated thienyl, furanyl, pyrrolyl, thiazolyl, oxazolyl, oxazinyl, thiazinyl, pyridinyl and azepinyl.

In the whole context to define alkyl or cycloalkyl but if "alkyl" means straight chain or branched $C_1$–$C_{30}$ alkyl, and "cycloalkyl" means $C_3$–$C_{12}$ cycloalkyl, for example cyclopropyl, cyclobutyl, cyclopentyl, cyclohexyl, cycloheptyl and the like.

Any substituent should not interfere with the cure of the oligomer or polymer.

The preferred organic sulfur derivatives are long-chain alkyl disulfides such as di-n-dodecyl disulfide, arylalkyl disulfides such as dibenzyl disulfide, or aryl disulfides such as diphenyl disulfide, or non-volatile, fusible oligoners containing dithioalklyl or dithioaryl groups. When one of these disulfides, for example, di-n-dodecyl or diphenyl disulfide, is added to a phenylethynyl terminated oligo-imide, such as those used as precursors for high temperature resins, the onset temperature of the curing reactions is reduced. In the case of the model compound, N-phenyl 4-phenylethynylphthalimide, differential scanning calorimetry (DSC) shows that the onset temperature of the curing reactions is reduced from 300° C. to below 250° C., and the peak exotherm temperature from 400° to 300° C. Fully cured resins can be obtained by heating at 300° C. to 320° C., whereas full cure of the same resin without additives requires cure temperatures above 360° C.

Figure 1:
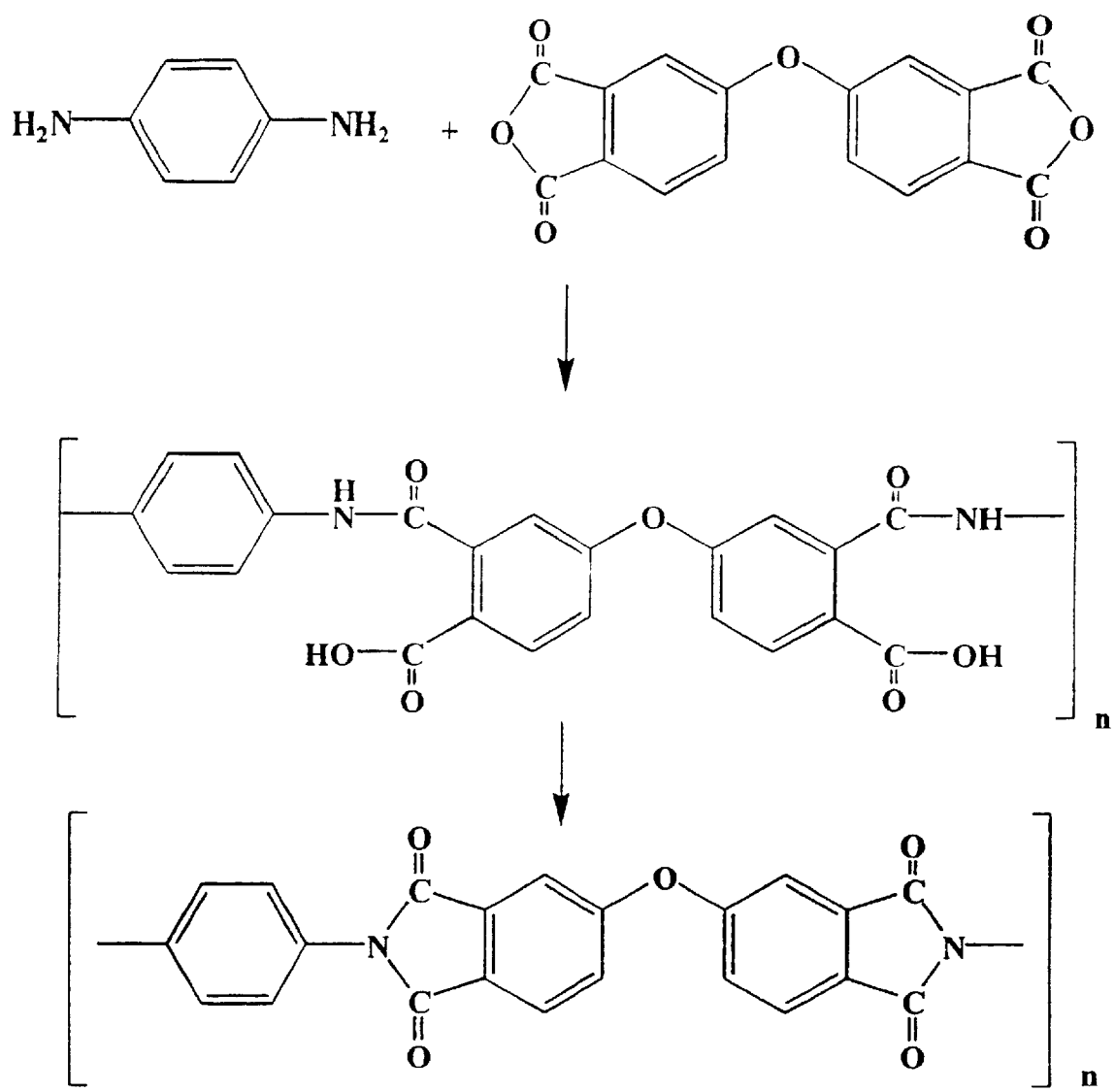
FIG. 1 shows the reaction for the formation of a polyamic acid and, subsequently, a polyimide.
Figure 2:
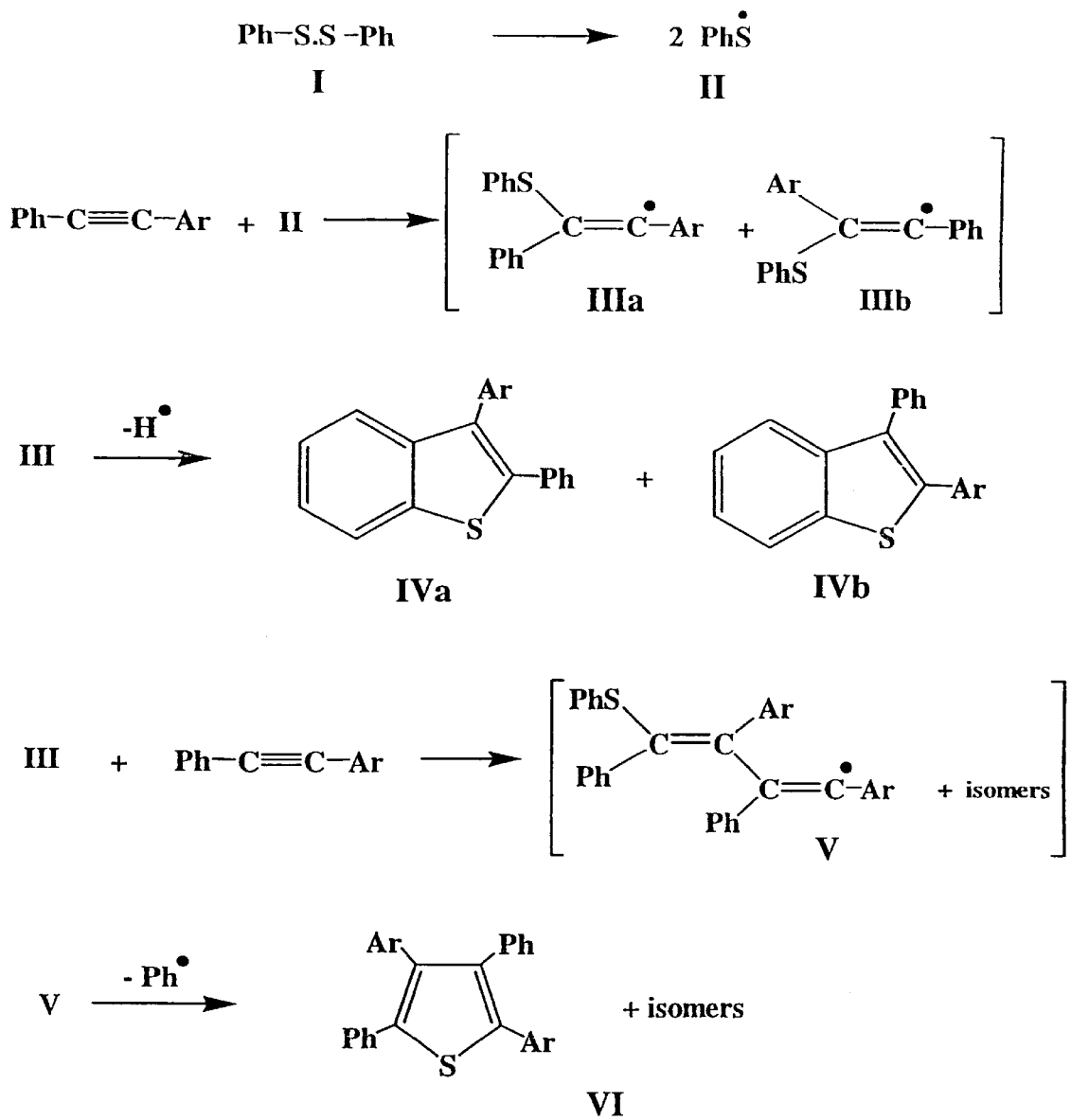
FIG. 2 shows a curing reaction according to the invention, where thiyl radicals are generated to cure acetylenic oligomers and polymers.
Figure 2:
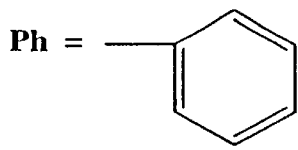
Figure 2:
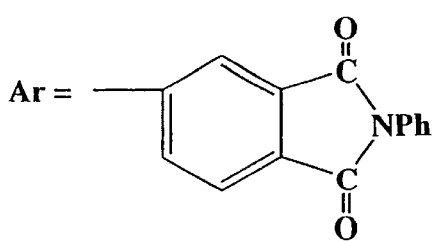

The course of these reactions and the properties of the products depends on the chemical structure of the disulfides and their derived thiyl radicals. In the case of alkyl and benzyl disulfides, studies of model compounds have indicated that the intermediate thiyl radicals initially react with one or more phenylethynyl groups to form a mixture of labile thiosubstituted vinylic and linear oligo-enes which are believed to undergo a series of further reactions to form the cured product. In the case of simple aromatic disulfides such as diphenyl disulfide (see FIG. 2, structure I), the intermediate thio-vinyl radical (i.e., the monomer adduct, III) formed from the initial attack on the phenylethynyl group by the thiyl radical (II) can also undergo a facile back-biting reaction with the latter to form thermally stable benzothiophenes (IV),as well as reacting with a second phenylethynyl group to form a dimer adduct (V). The latter can also undergo a backbiting reaction to form a mixture of tetra-aryl-substituted thiophenes (VI), as well as propagating to form higher poly-enes. Polyenes appear to be also formed indirectly through the aromatisation reactions which accompany the benzothiophene and thiophene formation. As a consequence of these backbiting reactions, the initial products from the arylthiyl radical induced reactions tend to have lower molecular weights and more linear structures than those formed from alkyl- or benzylic-thiyl radicals.

Figure 3:
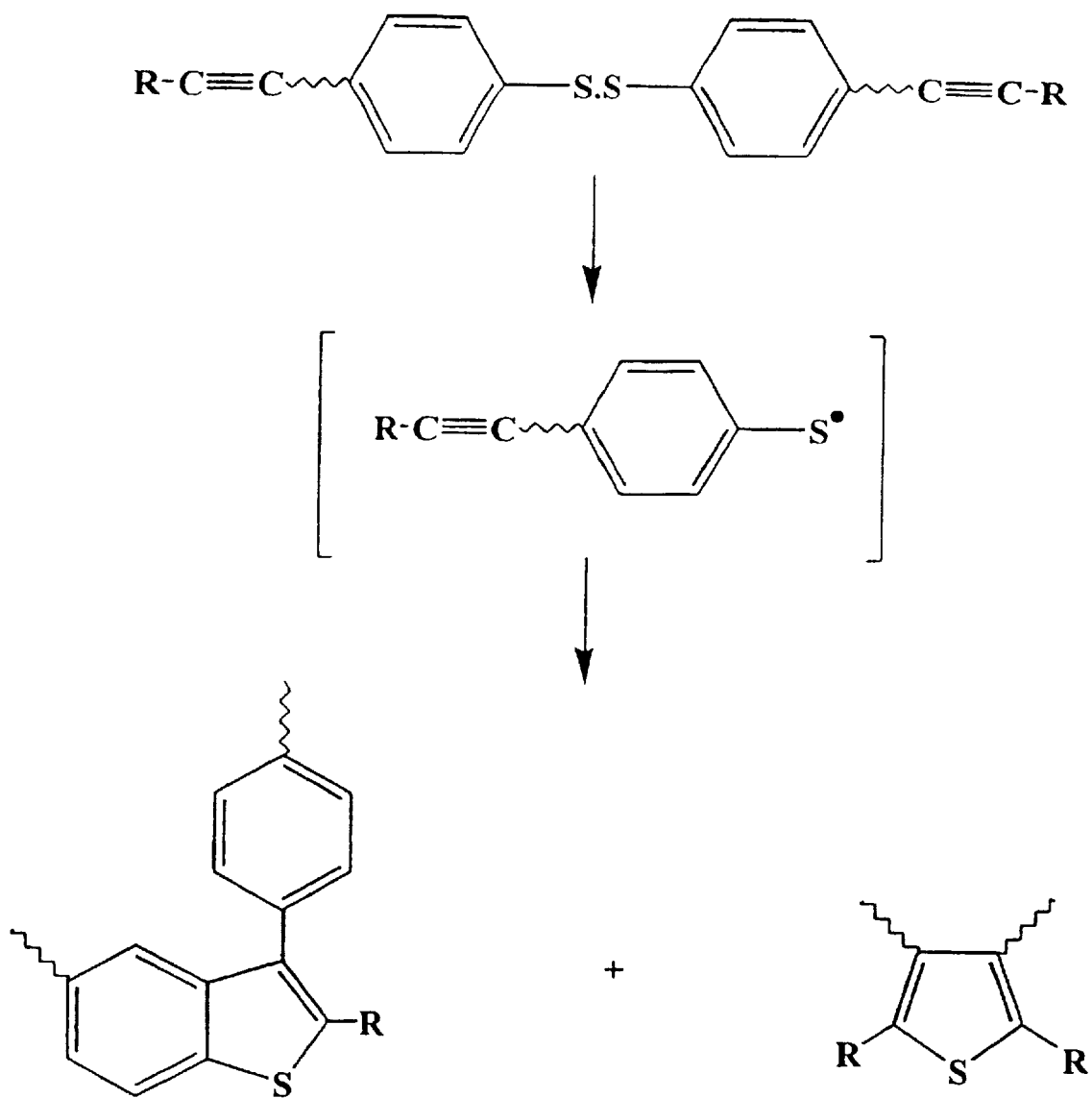
FIG. 3 shows a reaction using arylthiyl-generating oligomers to prevent the loss of active species through volatilization.

The thiyl radical generating moieties can also be incorporated as part of the ethynyl-containing oligo-imide chain. This prevents the possible loss of active species through volatilization during storage or processing, and also can result in more-effective chain extension and molecular weight build-up, particularly in the case of oligomers containing arylthiyl generating moieties (see FIG. 3). Although disulfides are preferred, the thiyl generating moieties may be analogues of any of the other additive types listed above. The products from these reactions differ significantly in both structure and properties from those formed in the cure of their disulfide-free analogues. The former are more lightly crosslinked and more thermoplastic in character than the latter; they have been found to be significantly tougher in consequence, but to have slightly lower Tg than the latter.

These disulfide containing oligomers can be readily prepared by the incorporation of a suitable amount of a diamino-disulfide or dianhydride-disulfide into the mixture of aromatic diamines, tetracarboxylic dianhydrides, and the phenylethynyl-substituted amine or anhydride normally used for the preparation of the oligo-imide. Formation of the intermediate disulfide-containing acetylenic oligo-amic acids and their thermal cyclodehydration in solution can be achieved without any significant premature reaction between the disulfide and phenylethynyl moieties. Alternatively, the disulfides can be formed by through reactions of substituents on monomeric or oligomeric components, for example, the aerial or chemical oxidation of mercapto-groups or the condensation reactions of mercaptans with sulfenyl derivatives.

Suitable diamino-disulfides can include aliphatic species, preferably those containing primary disulfides, such as 2,2'-dithiobis-1-ethanaminie (cystamine), 3,3'-dithiobis-1-propanamine, 1,1-dithiobis-2-propanamine, and higher aminoalkyl disulfides, as well as cycloaliphatic, aromatic, benzylic, and heterocyclic diamino-disulfides. For good thermal stability of the cured resins, aromatic diamino-disulfides are preferred, particularly bis(amino-aryl) disulfides such as 3,3'- and 4,4'-dithiobis(1-benzenamines) (aminophenyl disulfides, dithioanilines), or their derivatives bearing alkyl, aryl, alkoxy, aryloxy, halo, or other substituents:

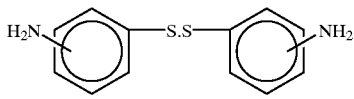

dithiobisnaphthylamines and substituted dithiobisnaphthamines, or extended species such as dithiobis (arylenoxy-arylamines), dithiobis(arylenecarbonyl-arylamines), dithiobis (arylenecarbonyl-iminoarylamines), or other species having the following general structure

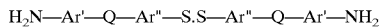

where Ar' and Ar" are the aromatic or substituted aromatic moieties bearing the amino and disulfide groups respectively; Q is a linking moiety which may be a single bond, a simple group such as hydrocarbyl, ether, thioether, carbonyl, ester, tert-amino, amide, imide or sulfone, or a more complex unit containing a series of linked aliphatic, alicyclic, aromatic or heterocyclic species, i.e. it may be oligomeric.

Preferred dianhydride-disulfides are aromatic compounds such 5,5'dithiobis(1,3-isobenzofurandione) (dithiodiphthalic anhydride) and dithiodinaphthalic anhydrides, their substituted derivatives, or other species having the general structure

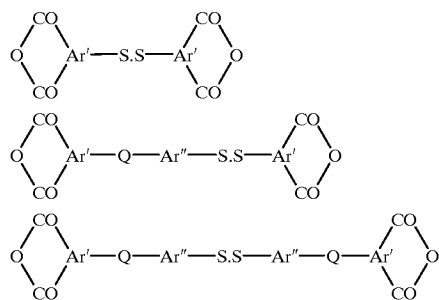

where Ar' is the moiety bearing the dicarboxylic anhydride group, and Ar" and Q are as described above.

Whilst the dithiodiamines or dithiodianhydrides can be used directly in the oligo-imide formulation, it is also possible to use derivatives such as amine salts or tetracarboxylic acids, esters, or hemi-esters, or other derivatives which can undergo displacement reactions during processing to form oligo-amidic or oligo-imidic products.

The molar ratio of the disulfide, as additive or moiety, relative to phenylethynyl content of the oligo-imide may lie between 2 and 12 mole of phenylethynyl groups per mole of disulfide additive. When the proportion of disulfide exceeds 1 mole per 2.5 mole of phenylethynyl moieties, free mercaptans derived from the parent disulfide may remain in the cured resin. If the proportion of disulfide is less than approximately 1 mole per 4 mole of phenylethynyl moieties, then the cure at temperatures of 300–320° C. is incomplete, leaving residual phenylethynyl groups; these can still undergo further, conventional curing reactions when the partially cured resin is heated to 360° C. or above. Whilst full cure may not be obtained when disulfide-starved formulations are heated at low temperatures, the degree of reaction may be adequate for practical purposes, and may also provide a useful and reproducible means for obtaining a partially cured or "B-staged" resin.

B-staging of resins can be advantageously achieved by the use of phenylethynyl-substituted oligomers containing aromatic disulfides as backbone moieties. On heating at moderate temperatures, below 300° C. for example, cleavage of the disulfide moieties and their subsequent reaction with the phenylethynyl groups results in the formation of a higher molecular weight thermoplastic polymer believed to contain benzothiophene linkages (see FIG. 3), together with a proportion of polyenemoieties which can undergo further reactions when heated at higher temperatures, above 300° C., to form a cured, lightly crosslinked product.

The oligomers should preferably contain at least two acetylenic moieties per oligomer chain. These may form the terminal units as depicted in the following structural outline (where [S$_x$] represents the thiyl generating species):

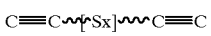

or they may be incorporated as substituent species or in chain-branching moieties along the chain to provide pendant ethynyls:

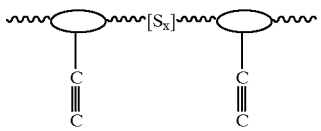

or as ethynyl links within the chain:

or any combination of these.

Each ethynyl group should be linked to at least one aromatic ring, but preferably to two rings to form a diarylacetylenic moiety. Examples of the latter include phenylethynyl-phthalimide, phenylethynyl-anilide, or phenylethynyl-phenoxyanilide terminal units:

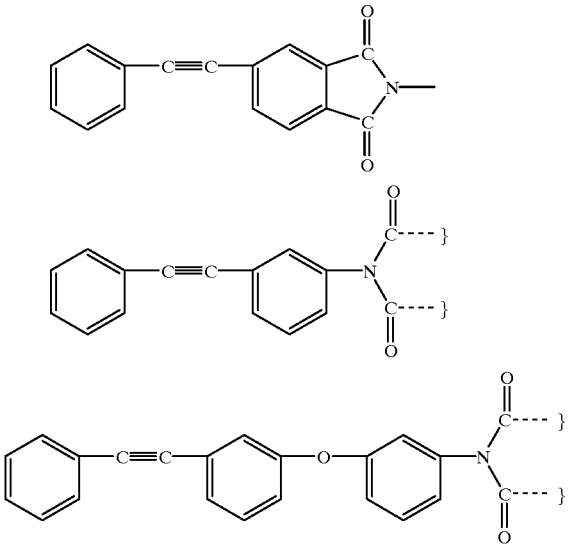

derived by the incorporation into the oligo-imide formulation of the corresponding substituted phthalic anhydride or anilines having the following structures, where R may represent a hydrogen, or an alkyl, aryl, or other substituent, and AR' is the aromatic moiety bearing the ethynyl group; Q, Ar'', and R are linking and substituent groups defined above:

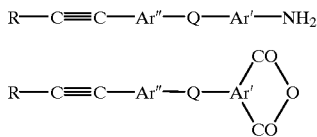

Non-terminal acetylenic moieties can be derived by the addition to the oligo-imide formulation, for example, of ethynyl- or phenylethynyl-substituted dianhydrides or diamines:

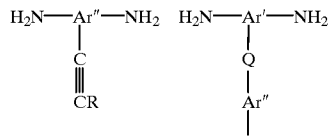

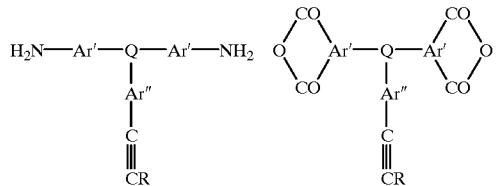

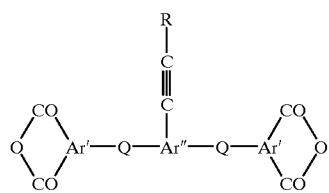

whilst in-chain diarylethynyl links can similarly result from the inclusion of ethynediyl-bisanhydrides or ethynediyl-bisamines:

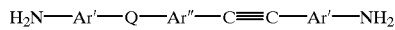

The composition of the remainder of the oligo-imide is not critical, and is determined by the required properties of the cured resin. The (number) average molecular weight of the oligo-imide may range from 1000 to 15,000, but the preferred range is 2,500 to 7,500. For materials intended for use at high temperatures, the formulation should be based on aromatic diamines and dianhydrides in order to achieve adequate mechanical properties and thermal stability. The oligomeric resin should have a melting point or glass transition temperature below the curing temperature to enable the curing reactions to proceed at acceptable rates. To obtain a suitable processing window and to improve the solubility of the oligomer, if required, the diarnines or dianhydrides may need to contain a proportion of extended (multi-nuclear) species having one or more diaryl-ether, -thioether, -carbonyl, or -sulfonyl linkages, and possibly also methyl or phenyl substituent groups. The compositions may also include a proportion or tri- or higher amines or anhydrides to form branched chain oligomers. These amines or anhydrides may be simple species or may themselves consist of oligomeric condensates bearing two or more free amino or anhydride substituents.

Methods for the preparation of oligomeric imides are well known. Typically, a mixture of one or more diamines is reacted with one or more dianhydrides in a suitable solvent to form a oligo-amic acid. The average molecular weight of this oligo-amic acid is determined by the stoichiometry, and material free from terminal amine or anhydride species and having a defined molecular weight can be obtained by the incorporation of a proportion of monoamine or monoanhydride which then form the terminal moieties. In the present invention, to form an ethynyl-terminated oligomer for example, the monoamine or monoanhydride would be one of the acetylenic derivatives listed above, whilst for a disulfide-containing oligomer, the diamines or dianhydrides would include a suitable proportion of a disulfide-substituted species to provide the required statistical ratio of ethynyl to disulfide groups.

The oligo-amic acid can be converted to a fully cyclized oligo-imide by dehydration, preferably by refluxing the solution and removing the by-product water as an azeotrope. The solvent mixture may consist of an amidic solvent such as N-methylpyrrolidone containing a minor amount of an azeotroping solvent such as toluene or xylene. Depending on the intended application, the oligo-imide solution may be used directly as a varnish, or it may be used to impregnate a fibrous tow, tape, or cloth, and then dried to form a prepreg for the production of laminated articles. Alternatively, the oligomer can isolated by precipitation on the addition of its solution to a non-solvent such as water or methanol, followed by washing and drying to remove residual solvents.

The oligo-imide may be used alone, when it includes disulfide-containing moieties, or it may be blended with the requisite quantity of a disulfide additive prior to curing the resin. Although the principal application of these oligomers may be as a matrix resin in the production of fibre-reinforced laminates, the fully-cyclized resin could also be suitable, with or without the addition of fillers or reinforcements, for the production of compression-moulded articles.

The invention also includes applications of the method of the invention, such as the production of a fibre-reinforced prepreg, in which the disulfide-containing oligo-amic acid solution is used to impregnate reinforcing fibres, with conversion to the oligo-imide by dehydration occurring in-situ during subsequent processing. It also includes applications in which a dry disulfide-containing oligo-imide is used to impregnate a fibrous tow, tape, or cloth to form a prepreg. It further includes applications in which the prepreg is heated, before or after laying up and consolidation of the laminated article, to convert (B-stage) the oligomeric matrix into a higher molecular weight, essentially thermoplastic polymer.

Curing of the oligomers can be achieved by conventional methods, by heating the neat resin or prepreg laminate, with consolidation under pressure to eliminate voids. The cure temperature required depends on the composition of the oligomer, but should be above 200° C. for dissociation of the disulfide to occur. For phenylethynyl resins containing an optimum amount of disulfide, fully cured materials can be obtained by heating to within 20° C. of the glass transition temperature of the product. The disulfide-acetylene curing chemistry can also be advantageously applied to acetylenic polymers other than polyimides. The cure of phenylethynyl-substituted polyetheretherketone has been found to mirror that of the polyimides, and this invention could be applied to the processing other aliphatic or aromatic condensation oligomers containing acetylenic substituents into high molecular weight or crosslinked polymers. These other oligomers include those containing hydrocarbyl, ether, sulfide, sulfone, carbonyl, ester, amide, and phosphine oxide linking moieties, or a combination of these, with or without imide moieties.

The invention is further described and illustrated by the non-limiting examples which follow. The following abbreviations are used for the names of chemical ingredients and solvents.

| | |
|---|---|
| PEPA | 4-phenylethynylphthalic anhydride |
| BPADA | 2,2-bis-[4-(3,4-dicarboxyphenoxy)phenyl]-propane dianhydride. |
| sBPDA | 3,3',4,4'-tetracarboxybiphenyl dianhydride |
| ODPA | 4,4'-oxydiphthalic anhydride |
| TMMD | 2,5,6-trimethyl-1,3-phenylene diamine |
| 3,4'-ODA | 3,4'-oxydianiline |
| 4,4'-ODA | 4,4'-oxydianiline |
| mPDA | 1,3-phenylene diamine |
| TPE-R | 1,3-bis-(4-aminophenoxy)benzene |
| APDS | 4-aminophenyl disulfide |
| TMTD | tetramethylthiuram disulfide |
| DMAc | dimethylacetamide |
| NMP | N-methylpyrrolidone |
| THF | tetrahydrofuran |

All temperatures are reported in degrees Celsius.

Differential scanning calorimetry (DSC) was used in the study of the curing reactions, the samples being heated at a rate of 10° C./min to 450° C. in a nitrogen atmosphere. DSC was also used for the determination of the glass transition temperature (Tg) of the cured resins. Gel permeation chromatographic analysis (GPC) in THF was used for determination of the number-average (Mn), weight-average (Mw), and elution-peak (Mp) molecular weights, using polystyrene standards for calibration.

EXAMPLE 1

A pure phenylethynyl-terminated oligo-imide was prepared by the reaction of N-(3-aminophenyl)4-phenylethynylphthalimide (2.8 g) with BPADA (1.51 g) in DMAc (10 ml), the intermediate bis-amic acid being cyclized by treatment with acetic anhydride (2.5 ml) and triethylamine (0.7 ml) at 60°. The product was recovered after precipitation into water. The dry acetylenic imide had a molecular weight of 1160 and melted at 165°. DSC analysis indicated a curing exotherm (208 J/g) commencing near 320° with a peak at 389°.

DSC analysis, heating in air, of a mixture containing 20 parts by weight of the acetylenic oligomer and 1 part of sulfur, equivalent to an ethynyl/"disulfide" ratio of 2.2:1, showed an endotherm with a peak near 140°, corresponding to the melting point of the sulfur, followed by a exotherm which commenced near 200° with peaks at 234° and 335° C. The magnitude of the second exotherm (over 1000 J/g) indicated that it may have been due to oxidation or other reactions of excess sulfur.

EXAMPLE 2

A mixture was prepared containing 5 parts of the acetylenic oligomer of Example 1 and 1 part of TMTD. DSC analysis of the mixture indicated a melting point near 180° followed by an complex exotherm having peaks at 244° and 362°.

EXAMPLE 3

A mixture was prepared containing 10 parts of the acetylenic oligomer of Example 1 and 1 part of diphenyl disulfide, corresponding to an ethynyl/disulfide ratio of 3.8:1. DSC analysis of the mixture indicated a curing exotherm which commenced near 210°, with a peak near 279°, and a second weaker peak near 390°; the latter is believed to result from curing of residual ethynyl groups remaining after the various disulfide/acetylene reactions which occurred in the main below 300°. There was also some evidence of the loss of diphenyl disulfide by volatilization from the unsealed system during the heating cycle.

EXAMPLE 4

A non-volatile disulfide-containing oligomer was prepared as follows.

4-Aminophenyl disulfide (APDS) was prepared by the reaction of 4-nitrochlorobenzene (110 g) with a refluxing solution of sodium hydrosulfide (160 g) in water (1 L) for 16 hr, followed by distillation to remove by-product 4-chloroaniline, approximately 150 ml of aqueous condensate being collected. The mixture was then cooled to 50° and treated with 17% aqueous hydrogen peroxide (200 ml). The crude amninophenyl disulfide was recovered by filtration and purified, first by refluxing with a 10% aqueous solution of sodium sulfite to decompose the aminophenyl trisulfide co-product, and then by recrystallisation from 400 ml of 1:1 aqueous ethanol. The yield of pure product was 74 g.

Phthalic anhydride (2.96 g) was added, with stirring, to a solution of TMMD (3.0 g) and APDS (4.96 g) in NMP (100 ml) at 20° under $N_2$. BPADA (16.14 g) was then added and the mixture stirred for a further 1 hr. Toluene (20 ml) was then added and the mixture heated under reflux, using a Dean-Stark trap to collect the water separated by azeotropic distillation. When water evolution had ceased, after 3.5 hr reflux, the mixture was cooled and the oligomer isolated by precipitation into methanol. The oligomer had a disulfide molar weight of 1300 and started to melt near 210°.

A phenylethynyl-terminated oligomer designed for high temperature service was prepared by the reaction of a mixture of PEPA (7.25 g), TMMD (7.41 g), mPDA (5.33 g), BPADA (21.0 g), and sBPDA (12.89 g) in 150 ml NMP. Toluene (30 ml) was added to the intermediate oligo-amic acid solution and the mixture heated under reflux for 5 hr, using a Dean-Stark trap to remove the by-product water. The resultant solution was cooled and the oligomer recovered by precipitation into water and then washed with hot methanol to remove the toluene and residual NMP. The oligomer has an ethynyl molar weight of 1800; DSC analysis indicated that melting started near 250°, and the material had a curing exotherm commencing near 300°, with a peak at 397°. The oligomer could be fully cured by heating at 360° for 4 hr, and the cured resin had a Tg of 302°.

Finely ground mixtures of the disulfide and acetylenic oligomers were prepared by treating a slurry of the two in a vibratory ball mill; the intimately mixed material was recovered by filtration and dried in vacuum at 180°. The mixtures contained 2, 4, 6, and 8 parts (by weight) of acetylenic oligomer per part of disulfide oligomer; these corresponded respectively to 1.4, 2.9, 4.3, and 5.7 ethynyl groups per disulfide.

DSC analysis of the 2:1 mixture showed that curing exothern commenced near 240°, with a peak at 309°. The 4:1 mixture showed a curing exotherm having two connected peaks, one near 265° corresponding to the melting point of the acetylenic oligomer, the other occurring at 3200. The 6:1 oligomer showed exotherm peaks near 260° and 332°, with a third minor peak near 397°. The 8:1 oligomer also showed three exotherm peaks, the peak near 260° being weak, whilst the major peak occurred at 389°; the latter is believed to correspond to cure reactions of the excess phenylethynyl groups.

The mixed oligomers were also cured by heating under pressure in a hydraulic press. The powders were first consolidated at 250°, then heated to 320° over 1 hr and held at that temperature for 4 hr before slowly cooling to room temperature. The 2:1 and 4:1 cured resins were brittle, and the former had a sulfurous smell. DSC analysis indicated that the Tg's of the polymers were: 2:1, 245°; 4:1, 282°; 6:1, 282°; 8:1, 283°. The cured 6:1 and 8:1 resins also showed an exothermic peak near 360°, indicative of an incomplete cure at 320°; rescan of the 8:1 sample showed that heating during the DSC analysis had fully cured the specimen, raising the Tg to 294°.

EXAMPLE 5

A phenylethynyl-terminated, disulfide-containing oligomer was prepared as follows. mPDA (5.72 g) and PEPA were dissolved in anhydrous NMP (100 ml) under N2 at 20°. APDS (1.74 g) was then added with stirring, followed by BPADA (26.00 g). After 10 hr, toluene (15 ml) was added and the mixture heated to reflux. The by-product water was collected in a Dean-Stark trap, small aliquots of toluene being added to maintain the refluxing mixture at a pot temperature of 160–165°. Water evolution ceased after 5 hr, after which the mixture was cooled and the oligo-imide recovered after precipitation into methanol. The oligomer had a ethyne/disulfide molar ratio of 3:1 and a molecular weight (Mn) of 3630. DSC analysis showed a curing exothern starting at 250°, with a peak at 300°.

The oligomer was heated at 180° under vacuum for 3 hr to remove residual solvent and then packed into a mould for curing. The mould was placed in a hydraulic press preheated to 200°. The powder was consolidated under pressure as the temperature was increased to 250° over 20 min. The temperature was then increased to 3000 over 50 min and then maintained at this temperature for 4 hr before slowly cooling to room temperature. The cured resin was mechanically tough, free from any sulfurous odour, and insoluble in solvents. DSC analysis indicated the material had a Tg of 232° and showed no measurable exotherm on heating to 450°, i.e., it was fully cured.

EXAMPLE 6

A low-melting oligomer containing a 2.85:1 molar ratio of ethynyl groups to disulfide, and soluble in THF, was prepared by the general method of Example 5, using as reagents: 5 3,4'-ODA (10.60 g), PEPA (449 6 g), APDS (1.74 g), and BPADA (26.00 g). The oligomer had Mn, 3800; Mw, 8046; and Mp, 7834. DSC analysis indicated that the onset of the cure exotherm occurred at 260°, with a peak at 314°.

A disulfide-free oligomer was also prepared using the reagents and method above, but substituting the APDS with 4,4'-ODA(1.40g). Onset of the DSC exotherm of the oligomer occurred at 320°, with a peak at 395° The oligomer had Mn, 3796; Mw, 8391; and Mp, 8396, indicating that negligible pre-reaction between the disulfide and phenylethynyl moieties occurred during the synthesis of its disulfide-containing analogue.

The disulfide-containing oligomer was first freed from residual solvent by heating at 180° under high vacuum to remove residual solvent, and then aliquots were heated in sealed tubes for times and at temperatures listed in Table 1. The molecular weights of the initial (dried) oligomer and its products are listed in the Table, together with the Tg, exotherm peak temperature (Tp) and enthalpy (H) values.

TABLE 1

| Heat | Mn* | Mw* | Mp* | Tg (° C.) | Tp (° C.) | H (J/g) |
|---|---|---|---|---|---|---|
| Initial | 3.9 | 8.5 | 8.4 | 171 | 314 | 42 |
| 204°/8 hr | 4.8 | 10.5 | 10.5 | 160 | 313 | 37 |
| 250°/2 hr | 8.5 | 19.8 | 18.9 | 179 | 335 | 4 |
| 250°/4 hr | 8.8 | 25.5 | 22.0 | 183 | 338 | 1 |
| 300°/1 hr | 13.8 | 42.9 | 40.2 | 192 | — | — |
| 300°/2 hr | 15.1 | 58.8 | 43.0 | 197 | — | — |
| 300°/4 hr | 17.2 | 68.5 | 49.4 | — | — | — |
| 320°/1 hr | 15.7 | 57.1 | 44.5 | — | — | — |

*(÷1000)

The tabulated data indicates that the oligomer is relatively stable at temperatures below 200°, but is readily transformed into a higher molecular weight, thermoplastic (soluble) polymer when heated at 250°. Heating for longer periods at 320°, or for higher temperatures results in the formation of a crosslinked, insoluble product. The enthalpy values (H) are an indicator of the residual reactivity of the product after the specified heat treatment. The late chain extension and crosslinking reactions occur without any apparent change in enthalpy; in this respect, the cure of the disulfide containing oligomer resembles that of its sulfur-free analogue.

EXAMPLE 7

A disulfide-containing oligomer analogous to that of Example 6, but containing a phenylethynylidisulfide molar ratio of 4:1 was prepared by the method of Example 5 using the following reagents: 3,4'-ODA (11.00 g), PEPA (4.96 g), APDS (1.24 g), and BPADA (26.00 g). Aliquots of the oligomer were treated as described in Example 6; the properties of the products are described in Table 2.

TABLE 2

| Heat | Mn* | Mw* | Mp* | Tg (° C.) | Tp (° C.) | H (J/g) |
|---|---|---|---|---|---|---|
| Initial | 4.6 | 9.4 | 8.8 | 170 | 308 (420) | 58 |
| 204°/8 hr | 4.2 | 10.0 | 10.4 | 171 | 318 (424) | 51 |
| 250°/2 hr | 8.3 | 18.5 | 17.4 | 183 | (336) 415 | 17 |
| 250°/4 hr | 7.6 | 20.0 | 19.1 | 187 | 418 | 13 |
| 300°/1 hr | 10.2 | 30.2 | 22.9 | 194 | 405 | 14 |
| 320°/1 hr | 11.8 | 49.9 | 24.9 | 198 | 415 | 13 |

*(÷1000)

In this case of this disulfide-starved oligomer, the reactions in occur in to distinct stages, the low temperature, disulfide-mediated which can occur readily at 250°, and appear as an DSC exotherm with a peak near 300°, and the reactions of the residual ethynyl groups which only occur at much higher temperatures, and appear as a second, overlapping exotherm with a peak above 400°. Samples heated for longer periods at 320° or, particularly, 360° or above became crosslinked and insoluble. The Tg of the fully cured resin was 209°.

EXAMPLE 8

Samples of the disulfide-free oligomer of Example 6 were blended respectively with di-n-dodecyl (aliphatic), dibenzyl (benzylic), and diphenyl (aromatic) disulfides to provide mixtures containing a phenylethynyl/disuefide molar ratio of 3:1.

Portions of the additive-free oligomer and that containing the aromatic disulfide were heated in sealed tubes at 250° for 15 hr. The properties of the products listed in Table 3.

TABLE 3

| Oligomer | Mn* | Mw* | Mp* | Tg (° C.) | Tp (° C.) | H (J/g) |
|---|---|---|---|---|---|---|
| Unheated | 4.2 | 9.1 | 9.4 | 165 | 395 | 63 |
| No additive | 5.2 | 12.8 | 11.4 | 170 | 395 | 47 |
| Blend | 4.7 | 10.7 | 10.5 | 161 | 286 | 4 |

*(÷1000)

The tabulated data show that the disulfide-free oligomer undergoes some degree of chain extension, probably initiated by adventitious impurities, when heated at 250°. In the presence of the aromatic disulfide, the oligomer reacts to a much greater extent, but the bulk of these reactions at 250° are believed to result in the conversion of the phenylethynyl end-groups of the oligomer into benzothiophene moieties which, in the case of a simple disulfide such as diphenyl disulfide, results in little change in molecular weight.

The oligomer blended with the aliphatic disulfide, on DSC analysis, showed an complex exotherm which commenced near 260° and had a peak at 295° with a shoulder near 370° which tailed to 400°, the greater part of the enthalpy change occurring after the 295°. The increase in molecular weights on heating aliquots at different temperatures are shown in Table 4.

TABLE 4

| Heat | Mn* | Mw* | Mp* |
|---|---|---|---|
| 250°/5 hr | 9.0 | 18.3 | 17.9 |
| 300°/2 hr | 10.4 | 23.1 | 21.6 |
| 320°/2 hr | 13.7 | 45.7 | 25.5 |

*(÷1000)

The initial reactions of the aliphatic disulfide with the oligomer at 250° are believed to result in a larger proportion of polyenes than the reactions with an aromatic disulfide, reflected by the greater increase in molecular weights on heating. The further increases in molecular weight are believed to result from the chain extension and branching reactions of these intermediate polyenes. This example indicates that the addition of simple aliphatic disulfides can catalyse the cure of disulfide-free oligomers to form potentially useful products.

The oligomer blended with the benzylic disulfide, on DSC analysis, showed an exotherm which commenced at 230°, with a major peak at 268° and secondary peak near 360°. The increase in molecular weights on heating aliquots are shown in Table 5.

TABLE 5

| Heat | Mn* | Mw* | Mp* |
|---|---|---|---|
| 250°/5 hr | 7.0 | 16.6 | 16.3 |
| 300°/2 hr | 9.3 | 25.5 | 21.8 |
| 320°/2 hr | 9.5 | 34.9 | 20.9 |

*(÷1000)

The onset of the cure exotherm of the oligomer blended with dibenzyl disulfide occurs at a lower temperature than that containing the aliphatic or aromatic sulfides; reflecting the more ready dissociation of the benzylic disulfides. Like the aliphatic disulfides, the monomeric benzylic disulfides also result in a significant molecular weight increase of the oligomer on heating the blend at low temperatures.

EXAMPLE 9

An phenylethynyl-terminated oligomer containing aliphatic disulfide moieties was prepared by the general method of Example 5 using the following reagents: 4,4'-ODA (5.21 g), PEPA (2.48 g), BPADA (13.00 g), bis-(2-aminoethyl) disulfide dihydrochloride (0.90 g), and triethylamine (0.81 g) in NMP (75 ml) and toluene (25 ml). The oligomer had Mn, 1790; and Mw, 2681. The oligomer on heating at 250° for 5 hr yielded a mechanically tough, crosslinked product which was swollen by, but largely insoluble in THF. However material heated at 300° or 320° for 5 hr was soluble in THF, its average molecular weights decreased with increase in cure temperature, probably reflecting the lower thermal stability of the aliphatic linkages. DSC analysis showed that the cure exotherm commenced at 265°, with a peak at 298°.

EXAMPLE 10

A phenylethynyl-terminated, disulfide-containing, fully-cyclized oligo-imide having a ethynyl/disulfide molar ratio of 3:1 and having a target Mn of 5000 was prepared by the general method of Example 5 using as reagents 3,4'-ODA (11.94 g), PEPA (3.72 g), TPE-R (3.36 g), SBPDA (20.22 g), and APDS (1.24 g) in 150 ml of NMP. A sulfur-free analogue of this formulation was also prepared by replacing the APDS with an equivalent molar amount of 3,4'-ODA (1.00 g).

DSC analysis of the sulfur-free oligomer showed that it had a Tg at 215° (the resin melted near 270°) with an exotherm peak at 407°. Superimposed on the exotherm was a sharp endotherm at 363° corresponding to the semicrystalline-melting point of the curing polymer. The oligomer, after curing at 360° for 3 hr yielded a tough, high temperature-, and solvent-resistant polymer having a Tg of 280° and a broad semicrystalline melting endotherm near 380°.

DSC analysis of the disulfide-containing oligomer showed that it had a Tg near 227° (the resin melted near 265°), with a complex cure exotherm. This showed an initial minor peak near 250°, with the main peak commencing near 280° and reaching a maximum near 355°. Samples when heated rapidly up to above the resin melting point could be cured to provide resins having Tg's of 260–270° but with a semicrystalline component analogous to that observed in the sulfur-free resin. DSC studies showed that the development of this crystallinity inhibited the cure of both types of resin unless the cure temperature was above the semi-crystalline melting point of the matrix. These tests also indicated the rapid advancement of the sulfur-containing oligomer on slow heating from 250° to higher temperatures prevented the development of a low viscosity melt desirable for composites processing.

EXAMPLE 11

The composition of the disulfide-containing oligomer of Example 10 was modified to limit the potential development of semi-crystallinity during cure and also to improve the resin flow characteristics by substituting 25 mole-% of the sBPDA dianhydride component with ODPA. The modified resin was prepared by the general method of Example 5, and contained as reagents 3,4-ODA (23.94 g), PEPA (7.44 g), TPE-R (6.68 g), sBPDA (30.33 g), ODPA (10.66 g), and APDS (2.48 g) in NMP (300 ml), with the addition of toluene (60 ml) as an azeotroping agent. DSC analysis indicated that the oligomer had Tg 197°, the exotherm peak was at 342°. The resin flowed readily at 230–250°, and could be cured by heating at 320° for 4 hr to form a tough material having a Tg of 260°; DSC analysis indicated that the cured resin was amorphous. The cured resin was tough, and the weight loss on long term ageing in air at 250° was very low, and comparable to that of the sulfur-free product of Example 10.

A similar formulation to that above, but containing only 15% of the dianhydride component as ODPA yielded an oligomer having a Tg of 220° which, on curing at 320°, provided an amorphous product having a Tg of 269°. However, the higher softening temperature of the oligomer resulted in the more rapid advancement of the resin and greater melt viscosities than those obtained using the oligomer containing 25% of ODPA.

EXAMPLE 12

A low-melting model phenylethynyl-terminated poly (etheretherketone) (PEEK) was prepared by the condensation of 4-phenylethynyl-4'-fluorobenzophenone (5.0 g) with 2,2-bis(4-hydroxyphenyl)-hexafluoropropane (2.8 g) by heating under reflux with potassium carbonate (2.5 g) in a mixture of DMAc (45 ml) and toluene (35 ml). DSC analysis of the product melted at 160° and had a cure exotherm which commenced at 320°, with a peak at 403°. A sample of the product was blended with diphenyl disulfide to provide a mixture having a ethynyl/disulfide molar ratio of 3:1. DSC analysis of this mixture indicated a cure exotherm which commenced at 210°, with a peak at 304°.

This example demonstrates that the promotion of the cure of the phenylethynylaryl moieties by disulfide is independent of the nature of the substituents on the aryl group.

An attempt was made to prepare a higher molecular weight disulfide-containing PEEK oligomer using the method above by the addition of APDS and difluorobenzophenone to the formulation. However, the mixture was found to be sufficiently alkaline to hydrolyse the disulfide bonds during the oligomer synthesis. In devising an alternative synthetic route for the oligomer, strongly acidic media would also need to be avoided as these can convert the disulfide to sulfenium ions which can undergo facile addition to the acetylenic moieties.

What is claimed:

1. A method for promoting the curing reactions of an acetylenic oligomer or polymer, characterised in that the oligomer or polymer has at least one ethynyl group and is cured in the presence of sulfur or an organic sulfur derivative which is capable of thermally generating thiyl radicals during the curing reaction thereby lowering the temperature of cure of the oligomer or polymer.

2. A method as claimed in claim 1, characterised in that the organic sulfur derivative is selected from disulfides and polysulfides of the formula

wherein ($n \geq 2$) and the substituents R and R' may be substituted or unsubstituted alkyl, cycloalkyl, aryl, arylalkyl, or heterocyclic moieties, and may be the same or different; and derivatives thereof.

3. A method as claimed in claim 1, characterised in that the organic sulphur derivative is a mono- or di-acyl or aroyl disulfide of the formula:

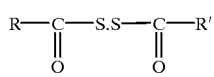

wherein R and R' are as defined in claim 1.

4. A method as claimed in claim 1, characterised in that the organic sulphur derivative is a mono- or di-acyl or aroyl disulfide of the formula:

$$R\text{—}\underset{\underset{O}{\|}}{C}\text{—S.S—}R'$$

wherein R and R' are as defined in claim 1.

5. A method as claimed in claim 1, characterised in that the organic sulphur derivative is an imidyl (imidoyl) or thiocarbamyl disulfide of the formula:

$$R\text{—}\underset{\underset{\underset{R'}{|}}{N}}{\overset{\|}{C}}\text{—S.S—}\underset{\underset{\underset{R'}{|}}{N}}{\overset{\|}{C}}\text{—}R' \qquad \underset{R}{\overset{R}{\diagdown}}N\text{—}\underset{\underset{S}{\|}}{C}\text{—S.S—}\underset{\underset{S}{\|}}{C}\text{—}N\underset{R'}{\overset{R}{\diagup}}$$

wherein R and R' are as defined in claim 1.

6. A method as claimed in claim 1 or claim 2, characterised in that organic sulfur derivative is long-chain alkyl disulfide, an arylalkyl disulfide or an aryl disulfide or a non-volatile, fusible oligomer containing dithioalkyl or dithioaryl groups.

7. A method as claimed in claim 1, characterised in that the sulfur or organic sulfur derivative is mixed with the acetylenic oligomer or polymer before curing.

8. A method as claimed in claim 1, characterised in that the organic sulfur derivative is covalently bound to, and forms an integral part of the acetylenic oligomer or polymer.

9. A method as claimed in claim 1, characterised in that one mole of the organic sulfur derivative is present for each 2 to 12 moles of ethynyl groups present in the oligomer or polymer.

10. A method as claimed in claim 1, characterised in that the acetylenic oligomer or polymer contains two or more ethynyl groups per oligomer or polymer chain.

11. A method as claimed in claim 1, characterised in that the ethynyl groups present in the oligomer or polymer are disubstituted.

12. A method as claimed in claim 11, characterised in that the substituents are aryl groups.

13. A method as claimed in claim 9, characterised in that the ethynyl groups comprise the terminal groups of the oligomer or polymer.

14. A method as claimed in claim 9, characterised in that the ethynyl groups are pendant substituents on the oligomer or polymer.

15. A method as claimed in claim 9, characterised in that the ethynyl groups form part of the backbone of the oligomer.

16. A method as claimed in claim 9, characterised in that the oligomer is a condensation polymer.

17. A method as claimed in claim 15, characterised in that the oligomer is a poly-imide having a molecular weight in the range 1000 –15,000.

18. An acetylenic oligomer or polymer having at least one ethynyl group, characterised in that it comprises an organic sulfur moiety which is covalently bound to, and forms an integral part of the oligomer or polymer and which is capable of thermally generating thiyl radicals during cure of the oligomer or polymer thereby promoting the cure of the oligomer or polymer.

19. A composition which comprises an acetylenic oligomer or polymer having at least one ethynyl group and sulfur or an organic sulfur derivative having an organic sulfur moiety, characterised in that the sulfur or organic sulfur derivative is capable of thermally generating thiyl radicals during cure of the oligomer or polymer thereby lowering the temperature of cure of the oligomer or polymer.

20. An oligomer, polymer or composition as claimed in claim 18 or 19, characterised in that it includes an organic sulfur derivative having an organic sulfur moiety derived from an aliphatic or aromatic disulfide.

21. An oligomer, polymer or composition as claimed in claim 18 or 19, characterised in that one mole of the organic sulfur moiety is present for each 2 to 12 moles of ethynyl groups present in the oligomer or polymer.

22. An oligomer, polymer or composition as claimed in claim 18 or 19, characterised in that the acetylenic oligomer or polymer contains two or more ethynyl groups per oligomer or polymer.

23. An oligomer, polymer or composition as claimed in claim 18 or 19, characterised in that the oligomer is a poly-imide having a molecular weight in the range 1000–15,000.

24. A process for producing an acetylenic poly-imide oligomer or polymer containing one or more ethynyl group per molecule and containing an aliphatic or aromatic disulfide moiety which is covalently bound to, and forms an integral part of the oligomer or polymer and which is capable of lowering the temperature of cure of the oligomer or polymer, characterised in that a suitable amount of a bis(amino-substituted)hydrocarbyl disulfide or bis (anhydride-substituted)hydrocarbyl disulfide, or any suitable derivative or precursor thereof, is introduced into the mixture of aromatic diamines, tetracarboxylic dianhydrides, and the phenylethynyl-substituted amine or anhydride normally used for the preparation of the oligo-imide or polymer.

25. A process as claimed in claim 24, characterised in that a dithiodiamine or dithiotetracarboxylic anhydride, or any suitable derivative or precursor thereof is used.

26. A composition or composite material characterised in that it comprises an oligomer, polymer or composition as claimed in claim 18 or 19.

27. A reinforced article characterised in that the composition of claim 26 is used to form the matrix for preparation of the article.

28. A reinforced article as claimed in claim 27, characterised in that the reinforcement is a fibre tow, tape or cloth.

29. A fibre-reinforced prepreg, characterised in that it comprises an oligomer, polymer or composition as claimed in claim 18 or 19.

30. A process for forming a thermoplastic high molecular weight polymer which on heating at temperatures above 300° C. can undergo further reactions to form a crosslinked, thermoset article, characterised in that an acetylenic oligomer, polymer or composition as claimed in claim 18 or 19, or a resin-reinforcement mixture containing such an oligomer, is heated at temperatures of 200° C. to 300° C.

31. A method according to claim 1 or 2 wherein the organic sulfur derivative is an acetylenic oligomer or polymer having at least one ethynyl group, characterised in that it comprises an organic sulfur moiety which is covalently bound to, and forms an integral part of the oligomer or polymer and which is capable of thermally generating thiyl radicals during cure of the oligomer or polymer thereby promoting the cure of the oligomer or polymer.

* * * * *